US009518135B2

(12) United States Patent
Batinas-Geurts et al.

(10) Patent No.: US 9,518,135 B2
(45) Date of Patent: Dec. 13, 2016

(54) CATALYST SYSTEM FOR THE PRODUCTION OF ULTRA-HIGH MOLECULAR WEIGHT POLYETHYLENE

(71) Applicant: Saudi Basic Industries Corporation, Riyadh (SA)

(72) Inventors: Aurora Alexandra Batinas-Geurts, Sittard (NL); Nicolaas Hendrika Friederichs, Brunssum (NL); Tom Schoffelen, Hulsberg (NL); Erik Zuidema, 's-Hertogenbosch (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 181 days.

(21) Appl. No.: 14/364,676

(22) PCT Filed: Dec. 10, 2012

(86) PCT No.: PCT/EP2012/005089
§ 371 (c)(1),
(2) Date: Jun. 12, 2014

(87) PCT Pub. No.: WO2013/087185
PCT Pub. Date: Jun. 20, 2013

(65) Prior Publication Data
US 2014/0296454 A1    Oct. 2, 2014

(30) Foreign Application Priority Data

Dec. 12, 2011    (EP) .................. 11075269

(51) Int. Cl.
*C08F 4/651*    (2006.01)
*C08F 110/02*    (2006.01)
*C08F 2/06*    (2006.01)

(52) U.S. Cl.
CPC .................. *C08F 110/02* (2013.01)

(58) Field of Classification Search
CPC ....... C08F 4/6494; C08F 4/651; C08F 4/6567; C08F 2500/01; C08F 110/02
USPC ............... 526/124.8; 502/110, 126
See application file for complete search history.

(56) References Cited

U.S. PATENT DOCUMENTS

| 4,178,300 A | 12/1979 | van den Berg |
| 4,972,035 A * | 11/1990 | Suga .................. C08J 3/12 526/125.6 |
| 5,300,470 A * | 4/1994 | Cuffiani .................. C08F 10/02 502/103 |
| 6,294,682 B1 | 9/2001 | Rauleder et al. |
| 7,989,549 B2 | 8/2011 | Zhou et al. |
| 2014/0350200 A1 | 11/2014 | Baintas-Geurts et al. |

FOREIGN PATENT DOCUMENTS

| EP | 1273596 A1 | 1/2003 |
| JP | 04314708 A | 11/1992 |
| JP | 05255440 A | 10/1993 |
| JP | 09309921 A | 12/1997 |
| JP | H09309922 A | 12/1997 |
| JP | H11228635 A | 8/1999 |
| JP | 2003321583 A | 11/2003 |
| JP | 2004018697 A | 1/2004 |
| JP | 4314708 B2 | 8/2009 |
| JP | 5255440 B2 | 8/2013 |
| WO | 03106511 A1 | 12/2003 |
| WO | 2009112254 A1 | 9/2009 |
| WO | 2010006756 A1 | 1/2010 |
| WO | 2011144431 A1 | 11/2011 |

OTHER PUBLICATIONS

Weber et al.; "Determination of the Titanium Oxidation States in a MgCl2-Supported Ziegler-Natta Catalyst (CW-Catalyst) During Aging and Polymerization"; Transition Metals and Organometallics as Catalysts for Olefin Polyermization; 1988; pp. 45-53.

(Continued)

*Primary Examiner* — Fred M Teskin
(74) *Attorney, Agent, or Firm* — Cantor Colburn LLP

(57) ABSTRACT

The invention relates to a catalyst system for the production of ultrahigh molecular weight polyethylene comprising I. a solid reaction product obtained by reaction of: (a) a hydrocarbon solution comprising (1) an organic oxygen containing magnesium compound or a halogen containing magnesium compound and (2) an organic oxygen containing titanium compound and (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1 II. an organo aluminium compound having the formula $AlR_3$ in which R is a hydrocarbon radical containing 1-10 carbon atoms and III. an external electron donor selected from the group of 1,2-dialkoxyalkanes, 1,2-dialkoxyalkenes or an external polymeric electron donor.

12 Claims, No Drawings

(56) References Cited

OTHER PUBLICATIONS

Alt et al.; "Bimodal Polyethylene—Interplay of Catalyst and Process"; Macromolecular Symposia; vol. 163, Issue 1; Jan. 2001; pp. 135-144.
Bent; "An Appraisal of Valence-Bond Structures and Hybridization in Compounds of the First-Row Elements"; Chemical Reviews; vol. 61, Issue 3; Jun. 1961; pp. 275-311.
Berzen et al.; "Ultrahigh Molecular Weight Polyethylene (Umhw-Pe): Application in Artificial Joints"; The British Polymer Journal; vol. 10; Dec. 1978; 4 Pages.
Bromstrup; "PE 100 Pipe Systems"; Second Edition; ISBN 3-8027-2728-2; pp. 16-20, (Copyright 2004).
Dall' Occo et al.; "Industrial Aspects of the Production of Catalysts for Ethylene Polymerization"; Transisition Metals and Organometallics as Catalysts; 1998; pp. 209-222.
Fregonese et al.; "Ziegler-Natta MgCl2-Supported Catalysts: Relationship Between Titanium Oxidation States Distribution and Activity in Olefin Polymerization"; Journal of Molecular Catalysis A: Chemical; vol. 172, Issues 1-2; Jul. 5, 2001; pp. 89-95.
Garoff et al.; "Decrease in Activity Caused by Hydrogen in Ziegler-Natta Ethene Polymerisation"; European Polymer Journal; vol. 38, Issue 1; Jan. 2002; pp. 121-132.
Japanese Patent No. H11228635 (A); Publication Date: Aug. 24, 1999; Machine Translation; Document No. XP002682161; 15 Pages.
Kelly; "Ultra-High Molecular Weight Polyethylene"; Journal of Macromolecular Science Part C—Polymer Reviews; vol. C42, No. 3; 2002; pp. 355-371.
Kurelec et al.; "Strain Hardening Modulus as a Measure of Environmental Stress Crack Resistence of High Density Polyethylene"; Polymer; vol. 46, Issue 17; Aug. 8, 2005; pp. 6363-6379.
International Search Report; International Application No. PCT/EP2012/005089; International Filing Date: Dec. 10, 2012; Date of Mailing: Jun. 26, 2013; 4 Pages.
Stein; "Ultra High Molecular Weight Polyethylene (UHMWPE)"; Engineered Materials Handbook; vol. 2: Engineering Plastics; 1998; 7 Pages.
Machine Translation of JPH05255440; Date of Publication: Aug. 7, 2013; 7 Pages.
Japanese Patent No. 04314708(A); Date of Publication: Nov. 5, 1992; Machine Translation; 13 Pages.
Japanese Patent No. 05255440(A); Date of Publication: Oct. 5, 1993; Machine Translation; 17 Pages.
Japanese Patent No. 09309921(A); Date of Publication: Dec. 2, 1997; Machine Translation; 12 Pages.
Written Opinion of the International Searching Authority for International Application No. PCT/EP2012/005089; International Filing Date: Dec. 10, 2012; Date of Mailing: Dec. 12, 2011; 5 Pages.

\* cited by examiner

CATALYST SYSTEM FOR THE PRODUCTION OF ULTRA-HIGH MOLECULAR WEIGHT POLYETHYLENE

CROSS REFERNECE TO RELATED APPLICATION

This application is a 371 of International Application No. PCT/EP2012/005089, filed Dec. 10, 2012, which claims priority to European Application No. 11075269.8, filed Dec. 12, 2011, both of which are hereby incorporated by reference in its entirety.

The present invention relates to a catalyst system and to a process for the production of ultra-high molecular weight polyethylene in the presence of this catalyst system.

The catalytic production of polyethylene is very well known in the art. A very special class of polyethylene is ultra-high molecular weight polyethylene (UHMWPE) with a very high average molecular weight ranging from about 1000000 to well above 6000000 grams/mole whereas high density polyethylene (HDPE) typically has a molar mass between about 50000 and 300000 g/mol. Therefore, these linear polymers have an average molecular weight much higher than that of high density polyethylene. The polymer synthesis to obtain UHMWPE is disclosed in Journal of Macromolecular Science Part C Polymer Reviews, Vol. C42, No 3, pp 355-371, 2002. The higher molecular weight gives UHMWPE the unique combination of characteristics making it suitable for applications where lower molecular weight grades fail. The very high molecular weight of this polyethylene results in excellent properties for example a very high abrasion resistance, a very high impact resistance, a very high melt viscosity and a low dynamic coefficient of friction. Because of the high molecular weight and the high melt viscosity specialized processing methods like compression moulding and ram extrusion are applied. Due to the high molecular weight, UHMWPE displays a bad flowability when molten, it is difficult to mould it into a pellet form and the product has to be delivered in a powder form and even more important, it has also to be processed from powder. Consequently, the powder properties heavily determine the production process as well as the converting process. For example, this powder has to be stored and to be transported, and consequently the bulk density of the UHMWPE powder is very important. A higher bulk density may decrease clogging at its transportation and it is possible to increase a storable amount per unit volume. By increasing the bulk density, the weight of the UHMWPE per unit volume present in a polymerization vessel can be increased and the concentration of the ultrahigh-molecular-weight polyethylene powder in the polymerization vessel can be enhanced. Similarly in the processing of UHMWPE a high bulk density also is required. As mentioned, typical processing procedures are ram extrusion and compression moulding. Both methods in principle involve sintering of the powder particles. See for example: H. L. Stein in Engineered Materials Handbook, Volume 2: Engineering Plastics, ASM International 1999 page 167-171. In order for this sintering to become effective, it is very important that a dense polymer powder packing is achieved, which translates into a high bulk density. The bulk density of UHMWPE should be above 300 kg/m$^3$ more preferably above 350 kg/m$^3$ and even more preferably above 400 kg/m$^3$. Also the average particle size of the UHMWPE powder is an important characteristic. The average particle size ($D_{50}$) is preferably lower than 250 micro meters, more preferably below 200 micro meters. In addition, the particle size distribution, commonly known as the "span", defined as $(D_{90}-D_{10})/D_{50}$, should be low, preferably below 2, and even more preferably below 1.5.

Related to the particle size distribution of the UHMWPE powder is the amount of coarse polymer powder particles. These coarse particles have a particle size larger than 300 µm and often are present in the form of agglomerates of powder particles. The mass fraction of these coarse particles should be as low as possible because they can adversely affect the properties of the final UHMWPE article. One way to eliminate coarse particles is to pass the final UHMWPE powder through a screen with a specified mesh size. It is not desired that these coarse particles are formed during the polymerization.

It is known (for example Dall'Occo et al, in "Transition Metals and Organometallics as Catalysts for Olefin Polymerization" (Kaminsky, W.; Sinn, H., Eds.) Springer, 1988, page 209-222) that the shape of the polymer powder particles is translated from the shape of the catalyst particles, also known as the replica phenomenon. In general, when this replication takes place, the average particle size of the polymer is proportional to the cube root of the catalyst yield, i.e. the grams of polymer produced per gram of catalyst. Due to this proportionality, one could produce small polymer particles by reducing the catalyst yield, but this causes high catalyst residues in the polymer and also high catalyst costs needed to produce the polymer. This puts severe requirements on the catalyst because a high catalyst activity is required combined with a polymer particle size below 250 µm, preferably below 200 µm.

WO 2009/112254 discloses a catalyst system, suitable to produce UHMWPE with adequate bulk density and powder morphology. Regarding the examples, the molecular weight of the obtained UHMWPE is in general adequate for a lot of UHMWPE applications. However there is still a need for producing even higher molecular mass UHMWPE. It is a well-known method to produce higher molecular weight polymers by using lower polymerisation temperatures. However, lowering the polymerization temperature requires increased cooling to remove the heat as liberated from the exothermic polymerisation reaction and hence using lower polymerisation temperatures is economically not preferred.

It is the object of the present invention to provide a catalyst which results in UHMWPE displaying a high powder bulk density, a narrow span, an average particle size below 250 µm, forms very few coarse particles, displays a high catalyst activity and furthermore is able to produce very high molar mass polymers at high polymerization temperature.

The catalyst system according to the invention comprises
I. the solid reaction product obtained by reaction of:
 (a) a hydrocarbon solution comprising
  (1) an organic oxygen containing magnesium compound or a halogen containing magnesium compound and
  (2) an organic oxygen containing titanium compound and
 (b) a mixture comprising a metal compound having the formula MeR$_n$X$_{3-n}$ in which X is a halogenide, Me is a metal of Group III of Mendeleev's Periodic System of Chemical Elements, R is a hydrocarbon radical containing 1-10 carbon atoms and 0≤n≤3 and a silicon compound of formula R$_m$SiCl$_{4-m}$, wherein 0≤m≤2 and R is a hydrocarbon radical containing 1-10 carbon atoms wherein the molar ratio of metal from I (b): titanium from I (a)(2) is lower than 1:1

II. an organo aluminium compound having the formula $AlR_3$ in which R is a hydrocarbon radical containing 1-10 carbon atoms and III. an external electron donor selected from the group of 1,2-dialkoxyalkanes, 1,2-dialkoxyalkenes or a polymeric electron donor.

The catalyst according to the invention is able to produce extremely high molar mass polymers and results in a very low amount of coarse polymer particles.

Another advantage of the catalyst is that the obtained UHMWPE displays an average particle size below 170 μm at high catalyst yields.

A further advantage of the catalyst is that the productivity is high.

Also the catalyst residues in the polymer are very low.

An additional advantage of the catalyst is that the synthesis to produce the catalyst is relatively simple and cheap based on readily available and relatively easy to handle compounds.

According to a preferred embodiment of the invention the catalyst system comprises I. the solid reaction product obtained by reaction of:
  (a) a hydrocarbon solution comprising
    (1) an organic oxygen containing magnesium compound or a halogen containing magnesium compound and
    (2) an organic oxygen containing titanium compound
  (b) a mixture comprising a metal compound having the formula $MeR_nX_{3-n}$ wherein Me is a metal of Group III of Mendeleev's Periodic System of Chemical Elements, X is a halogen and R is a hydrocarbon radical containing 1-10 carbon atoms and $0 \leq n \leq 3$ and a silicon compound of formula $R_mSiCl_{4-m}$, wherein $0 \leq m \leq 2$ and R is a hydrocarbon radical containing 1-10 carbon atoms wherein the molar ratio of metal from I (b): titanium from I (a)(2) i is lower than 1:1 and
  (c) post treatment of the obtained solid reaction product with an aluminium compound having the formula $AlR_nCl_{3-n}$ wherein R is a hydrocarbon radical containing 1-10 carbon atoms and $0<n \leq 3$ and II. an organo aluminium compound having the formula $AlR_3$ in which R is a hydrocarbon radical containing 1-10 carbon atoms.

III. an external electron donor selected from the group of 1,2-dialkoxyalkanes, 1,2-dialkoxyalkenes or an external polymeric electron donor.

According to a further preferred embodiment of the invention the external electron donor is a dialkoxy hydrocarbon compound represented by the formula (I):

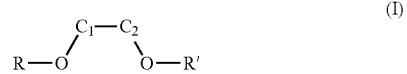

(I)

wherein $C_1$-$C_2$ is a connecting group consisting of 2 carbon atoms which are in the $sp^3$ and/or $sp^2$ hybridisation form and wherein the substituent's R and R' are hydrocarbon groups with 1-10 carbon atoms and may be the same or different and may optionally be substituted with other groups containing O, N, or Si.

Examples of hydrocarbon groups include alkyl groups, alkenyl groups, cycloalkyl groups, cycloalkenyl groups, aryl groups and aralkyl groups.

The meaning of $sp^3$ and/or $sp^2$ hybridisation is known to the man skilled in the art and for example described by Henry Bent in Chem.Review, 1961 (3) pages 275-311.

According to a preferred embodiment of the invention the external electron donor is selected from the group of 1,2-dialkoxyalkanes and 1,2-dialkoxyalkenes include 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

More preferably 1-allyl-3,4-dimethoxybenzene is applied.

In case of external polymeric electron donors formula (I) represents a reoccurring structural unit within the polymeric electron donor. Suitable examples of external polymeric electron donors include polyethylene glycol and/or polyethylene oxide.

Preferred metals of Group III of Mendeleev's Periodic System of Chemical Elements are aluminium and boron.

Preferably the halogenide is Cl.

It is essential that the components of the mixture (b) are used as a mixture in the reaction with the hydrocarbon solution (a) instead of being used separately or sequentially.

Preferably the metal compound from (b) having the formula $MeR_nX_{3-n}$ is an aluminium compound having the formula $AlR_nX_{3-n}$ in which X is a halogen and R is a hydrocarbon radical containing 1-10 carbon atoms and $0 \leq n \leq 3$.

Preferably the molar ratio of the metal from (b): titanium from (a) is lower than 1:1. The metal from (b) is preferably aluminium.

Preferably the hydrocarbon solution comprising an organic oxygen containing magnesium compound or a halogen containing magnesium compound is a hydrocarbon solution comprising an organic oxygen containing magnesium compound.

Suitable organic oxygen containing magnesium compounds include for example alkoxides such as magnesium methylate, magnesium ethylate and magnesium isopropylate and alkylalkoxides such as magnesium ethylethylate. Suitable halogen containing magnesium compounds include for example magnesium dihalides and magnesium dihalide complexes. Preferably the halide is chlorine.

Preferably the organic oxygen containing magnesium compound is a magnesium alkoxide.

Preferably the magnesium alkoxide is magnesium ethoxide.

Suitable organic oxygen containing titanium compounds may be represented by the general formula $[TiO_x(OR)_{4-2x}]n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates.

Preferably the organic oxygen containing titanium compounds are titanium alkoxides.

Suitable alkoxides include for example $Ti(OC_2H_5)_4$, $Ti(OC_3H_7)_4$, $Ti(OC_4H_9)_4$, and $Ti(OC_8H_{17})_4$.

Preferably the titanium alkoxide is $Ti(OC_4H_9)_4$.

Suitable examples of aluminium compounds having the formula $AlR_nX_{3-n}$ include aluminium tri chloride, ethyl aluminium dibromide, ethyl aluminium dichloride, propyl aluminium dichloride, n-butyl aluminium dichloride, isobutyl aluminium dichloride, diethyl aluminium chloride, diisobutyl aluminium chloride, triisobutyl aluminium and tri-n-hexyl aluminium.

Preferably the organo aluminium halogenide is an organo aluminium chloride, more preferably ethyl aluminium dichloride.

Suitable examples of organo aluminum compound of the formula $AlR_3$ include for example triethyl aluminium, tri-isobutyl aluminium, tri-n-hexyl aluminium and tri octyl aluminium.

The hydrocarbon solution of organic oxygen containing magnesium compound and organic oxygen containing titanium compound can be prepared according to procedures as disclosed for example in U.S. Pat. No. 4,178,300 and EP-A-876318. The solutions are in general clear liquids. In case there are any solid particles, these can be removed via filtration prior to the use of the solution in the catalyst synthesis.

The amount of aluminum compound in (b) should be low, typically below a molar ratio of aluminum from (b) to titanium from (a) of less than 1.

Generally the molar ratio of aluminium from (b): titanium from (a) is lower than 1:1. Preferably this ratio is lower than 0.8:1.and more preferably this ratio is lower than 0.6:1.

Generally the molar ratio of chlorine from $R_mSiCl_{4-m}$: oxygen as present in the hydrocarbon solution (a) is lower than 3:1 and preferably lower than 2:1.

Generally the molar ratio of magnesium: titanium is lower than 3:1 and preferably the molar ratio magnesium: titanium ranges between 0.2:1 and 3:1.

Generally the molar ratio Al from the aluminium compound in (b+c):Ti ranges between 0.05:1 and 1:1.

Generally the molar ratio Al from the aluminium compound in (b+c):Ti ranges between 0.05: 1 and 0.8:1.

Generally the molar ratio of the external electron donor (III) to the titanium from the solid reaction product (I) ranges between 0,01:1 to 10:1.

Generally the average particle size of the catalyst ranges between 3 μm and 30 μm. Preferably this average particle size ranges between 3 μm and 10 μm.

Generally the span of the particle size distribution is lower than 2, preferably below 1.

During the reaction of the hydrocarbon solution comprising the organic oxygen containing magnesium compound and the organic oxygen containing titanium compound with component (I b) a solid catalyst precursor precipitates and after the precipitation reaction the resulting mixture is heated and refluxed to finish the reaction.

The catalyst may be obtained by a first reaction between an organic oxygen containing magnesium compound and an organic oxygen containing titanium compound, followed by dilution with a hydrocarbon solvent, resulting in a soluble complex consisting of a magnesium alkoxide and a titanium alkoxide and thereafter a reaction between the hydrocarbon solution of said complex and the mixture comprising the metal compound having the formula $MeR_nX_{3-n}$ and the silicon compound of formula $R_mSiCl_{4-m}$.

The external donor compound is added during the polymerization to the polymerization reactor. The external donor is not used during or in the preparation of the solid reaction product (I). The addition of the external donor to the polymerization reactor can be either separate from the solid reaction product (I) and separate from the organoaluminium compound (II) or premixed with either the solid reaction product (I) and/or the organoaluminium compound (II) prior to entering the reactor. Such premixing can be performed for a certain period of time prior to adding to the polymerization reactor; preferably this premixing is less than 1 hour, more preferably less than 30 minutes.

According to a preferred embodiment of the invention the process to prepare the catalyst system for the production of ultra-high molecular weight polyethylene comprises:
I. reacting:
  (a) a hydrocarbon solution comprising
    (1) an organic oxygen containing magnesium compound or a halogen containing magnesium compound and
    (2) an organic oxygen containing titanium compound and
  (b) a mixture comprising a metal compound having the formula $MeR_nX_{3-n}$ in which X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from I (b): titanium from I (a)(2) i is lower than 1:1 and optionally
  (c) post treatment of the obtained solid reaction product with an aluminium compound having the formula $AlR_nCl_{3-n}$ wherein R is a hydrocarbon radical containing 1-10 carbon atoms and $0<n \leq 3$
and combining the reaction product from (I) with
II. an organo aluminium compound having the formula $AlR_3$ in which R is a hydrocarbon radical containing 1-10 carbon atoms
wherein an external electron donor selected from the group of 1,2-dialkoxyalkanes, 1,2-dialkoxyalkenes or a polymeric electron donor is added to the polymerisation system separately from the organo aluminium compound(II) and is premixed for less than 30 minutes with the solid reaction product from (I).

According to a preferred embodiment of the invention the mixture the metal compound having the formula $MeR_nX_{3-n}$ $n \leq 3$ and the silicon compound of formula $R_mSiCl_{4-m}$ comprises an aluminium compound having the formula $AlR_nX_{3-n}$ and a silicon compound of formula $R_mSiCl_{4-m}$ which is preferably used as a solution in a hydrocarbon.

A subsequent post treatment step in the presence of an aluminium alkyl or aluminium alkyl halogenide is possible.

The sequence of the addition can be either adding the hydrocarbon solution containing the organic oxygen containing magnesium compound and organic oxygen containing titanium compound to the mixture comprising the aluminium compound having the formula $AlR_nX_{3-n}$ and the silicon compound of formula $R_mSiCl_{4-m}$ or the reversed.

Preferably the hydrocarbon solution containing the organic oxygen containing magnesium compound and organic oxygen containing titanium compound is dosed to a stirred hydrocarbon solution comprising the aluminium compound having the formula $AlR_nX_{3-n}$ and the silicon compound of formula $R_mSiCl_{4-m}$.

The temperature for this reaction can be any temperature below the boiling point of the used hydrocarbon. It is however beneficial to use temperatures below 60° C., preferably below 50° C. Generally the duration of the addition is preferably longer than 10 minutes and preferably longer than 30 minutes.

In the reaction of the hydrocarbon solution comprising the magnesium compound, preferably the organic oxygen containing magnesium compound, and an organic oxygen containing titanium compound with the mixture of the halogen containing silicon compound and the aluminium compound, a solid catalyst precursor precipitates and after the precipitation reaction the resulting mixture is heated to finish the reaction. After the reaction the precipitate is filtered and washed with a hydrocarbon. Other means of separation of the solids from the diluent and subsequent washings can also be applied, like for example multiple decantation steps. All steps should be performed in an inert atmosphere of nitrogen or another suitable inert gas. The post treatment with an aluminium compound can be performed either before the filtration and washing steps or after this procedure.

During the reaction of the hydrocarbon solution comprising the organic oxygen containing magnesium compound and the organic oxygen containing titanium compound with component (I b) a solid precipitates and after the precipitation reaction the resulting mixture is heated and refluxed to finish the reaction.

Preferably the metal compound is an aluminium compound having the formula $AlR_nX_{3-n}$ in which X is a halogenide and R is a hydrocarbon radical containing 1-10 carbon atoms and $0 \leq n \leq 3$.

Generally more than 10% of the titanium in the solid reaction product in the $Ti^{3+}$ state. According to a preferred embodiment of the invention more than 25% of the titanium in the solid reaction product in the $Ti^{3+}$ state.

The present invention is also directed to a process for the production of ultra-high molecular weight polyethylene characterised in that the process takes place in the presence of the catalyst system comprising
I. a solid reaction product obtained by reaction of:
 (a) a hydrocarbon solution comprising
  (1) an organic oxygen containing magnesium compound or a halogen containing magnesium compound and
  (2) an organic oxygen containing titanium compound and
 (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower than 1:1 and optionally
 (c) post treatment of the obtained solid reaction product with an aluminium compound having the formula $AlR_nCl_{3-n}$ wherein R is a hydrocarbon radical containing 1-10 carbon atoms and $0<n \leq 3$ and
II. an organo aluminium compound having the formula $AlR_3$ in which R is a hydrocarbon radical containing 1-10 carbon atoms and
III. an external electron donor selected from the group of 1,2-dialkoxyalkanes, 1,2-dialkoxyalkenes or a polymeric electron donor.

The process results in UHMWPE having the required properties even at relatively high polymerization temperatures. The use of the catalyst in the process according to the present invention results in a polymer having a high powder bulk density, a narrow span, an average particle size below 250 micro meters, a low fraction of coarse particles and a very high molecular mass. Furthermore the catalyst has a high catalyst activity.

Generally the bulk density of the ultrahigh-molecular-weight polyethylene powder of the invention ranges between 350 kg/m$^3$ and 600 kg/m$^3$ and ranges preferably between 350 kg/m$^3$ and 550 kg/m$^3$ The poured bulk density of the ultrahigh-molecular-weight polyethylene polymer powder is determined by measuring the bulk density of the polymer powder according to the procedure outlined in ASTM D1895/A.

The polymerization reaction may be performed in the gas phase or in bulk in the absence of an organic solvent, or carried out in liquid slurry in the presence of an organic diluent. The polymerization can be carried out batchwise or in a continuous mode. These reactions are performed in the absence of oxygen, water, or any other compounds that may act as a catalyst poison. Suitable solvents include for example alkanes and cycloalkanes such as for example propane, isobutane, pentane, hexane, heptane, n-octane, iso-octane, cyclohexane, and methylcyclohexane and alkylaromatics such as for example toluene, xylene, ethylbenzene, isopropylbenzene, ethyltoluene, n-propylbenzene and diethylbenzene.

Generally the polymerization temperature ranges between 20 and 200° C. and preferably between 20 and 120° C. According to a preferred embodiment of the invention the polymerization temperature ranges between 50 and 95° C.

The total pressure during polymerization is adequately the atmospheric pressure and more preferably 2-40 bars. (1bar=100000 Pa).

The molecular mass of the polymer can be controlled by any means as known in the art, such as for example by adjustment of the polymerization temperature or by the addition of molecular weight control agents for example hydrogen or zinc alkyls. Due to the very high molecular weight of UHMWPE, it is difficult to analyze its molar mass by for instance Gel Permeation Chromatography (GPC) or Size Exclusion Chromatography (SEC). Hence it is common to measure the viscosity of a dilute solution of UHMWPE, for instance in decalin at 135° C. This viscosity value can subsequently be translated to the molecular weight value.

Alternatively, the so called Elongational Stress can be determined according to DIN 53493. This Elongational Stress, sometimes also referred to as "Flow Value", can subsequently be translated into the molecular weight as disclosed for example by J. Berzen et al. in The British Polymer Journal, Vol. 10, December 1978, pp 281-287.

UHMWPE can be applied in articles in very different areas where excellent impact strength and abrasive wear resistance are required. In medical applications UHMWPE is used in knee, shoulder and hip implants, high strength fibres made from UHMWPE can be found in ballistic cloth, fishing lines and nets and in the mining industry. UHMWPE may be used as hopper or bunker liners.

The invention also relates to the use of external electron donors selected from the group of 1,2-dialkoxyalkenes, 1,2-dialkoxyalkanes or polymeric donors in the production of ultra high molecular weight polyethylene. Preferably the external electron donors are selected from the group of 1,2-dialkoxyalkenes and 1,2-dialkoxyalkanes.

WO 2011/144431 discloses a process for the preparation of an ethylene polymer comprising (co)polymerizing ethylene in the substantial absence of hydrogen as a chain transfer agent and in the presence of a catalyst system comprising the product obtained by contacting (a) a solid component comprising Ti, Mg, halogen, and an internal electron donor compound selected from the group consisting of 1,2-diethers, mono or diesters of 1,2-dihydroxy compounds, and monoethers-monoesters of 1,2-dihydroxy compounds with (b) an aluminum alkyl compound. WO 2011/144431 is directed to an internal donor because the donor is part of the solid component. $MgCl_2.nROH$ is caused to react with an excess of liquid $TiCl_4$ and an electron donor. Then, the solid may be reacted once more with $TiCl_4$, separated and washed with a liquid hydrocarbon until no chlorine ions can be detected in the wash liquid. The internal electron donor is used in the preparation of the solid compound for example the donor is added together with the titanium compound to the MgCl$_2$.n ROH adduct. The donor can also be first contacted with the MgCl$_2$.n ROH and the titanium compound followed by subsequent washing. The internal donor is preferably present in the solid compound in an amount ranging from 0,1-20 wt %, whereas in the present invention, the solid compound is essentially free from any donor compounds belonging to the ones described in WO 2011/14431.

The titanium compound used in the preparation of the solid component according to WO 2011/14431 has a Ti-Cl bond whereas in the present invention the titanium compound used in the preparation of the solid component is an organic oxygen containing titanium compound substantially free of chlorine.

More than 70% of the titanium atoms in the solid compound according to WO 2011/14431 are in the Ti$^{4+}$ state.

Regarding the average particle size of the polymer the examples of WO 2011/144431 teach not to apply a donor compound because with use of the donor the average particle size may be between 370 and 498 µm. For the use in UHMWPE, the particle size of the polymer should preferably be below 250 µm, more preferably below 200 µm. The process according to the present invention results in an average particle size below 170 µm.

The invention will be elucidated by means of the following non-restrictive examples.

EXAMPLES

All examples were carried out under a blanket of nitrogen.

The solids content in the catalyst suspension was determined in triple by drying 10 ml of a catalyst suspension under a stream of nitrogen, followed by evacuating for 1 hour and subsequently weighing the obtained amount of dry catalyst.

The average particle size (D$_{50}$) of the catalyst was determined by the so called laser light scattering method in hexanes diluent, using a Malvern Mastersizer equipment.

The average particle size and particle size distribution ("span") of the polymer powders were determined by sieve analyses according to DIN53477.

Experiment I

Preparation of a Hydrocarbon Solution Comprising the Organic Oxygen Containing Magnesium Compound and the Organic Oxygen Containing Titanium Compound 100 grams of granular Mg(OC$_2$H$_5$)$_2$ and 150 millilitres of Ti(OC$_4$H$_9$)$_4$ were brought in a 2 litre round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Experiment II

Preparation of a Catalyst (According to WO2009/112254)

400 ml of hexanes were added to a 0,8 L glass reactor, equipped with a condensor, a stirrer, baffles and a peristaltic pump. To this, 17.3 ml of SiCl$_4$ (152 mmol) and 3,5 ml ethyl alumimium dichloride (EADC) (11,9 mmol) were added. The mixture was at ambient temperature when the stirrer rate was set at 1700 RPM. Via the peristaltic pump, 200 ml of a solution prepared according to the procedure as outlined in Example I was added over a period of 4 hours. The obtained white suspension was subsequently refluxed for 2 hours. The slurry was cooled down to ambient temperature, filtered and washed 3 times with hexane. Finally the solids were taken up in hexane and stored under nitrogen. A sample was used to determine the elemental composition of the catalyst using Neutron Activation Analysis.

Obtained weight percentages: Ti: 4.84±0.35 wt %; Mg: 12.3±0.9 wt %; Al: 0.66±0.05 wt %; Cl: 46.8±3.3 wt %. The Si content, determined using X-Ray Fluorescence, was 4.2 wt %. The D$_{50}$ of the catalyst was 4.9 µm.

Comparative Example A

Polymerization

The polymerization of ethylene was carried out in a 10 litre autoclave using 5 litre purified hexanes as a diluent. 8 Mmols of tri-isobutylaluminium were added to the 5 litre purified hexanes. The mixture was heated to 75° C. and pressurized with 4.0 bar of ethylene. After this, 40 mg of the solid product of Experiment I in hexanes were injected into the reactor via a separate injection vessel using nitrogen overpressure. The temperature was maintained at 75° C. and the pressure was kept constant by feeding ethylene. The reaction was stopped after 150 minutes. Stopping was performed by de-pressurizing and cooling down the reactor. The reactor contents were passed through a filter; the wet polymer powder was collected, subsequently dried, weighed and analyzed. The results are summarised in Table 1.

Comparative Example B

Polymerization

The polymerization of ethylene was carried out as described in Comparative Example A, with the difference that the polymerization was carried out at a temperature of 65° C. while the ethylene pressure was increased to 6.5 bars. The results are summarised in Table 1.

Example I

Polymerization

The polymerization of ethylene was carried out as described in Comparative Example A, with the difference that 5.3 ml of a 0.00628 M solution of Methyl Eugenol (ME=1-allyl-3,4-dimethoxybenzene) in hexanes were added to the catalyst slurry in the injection vessel and allowed to contact for 10 minutes prior to injection into the polymerization vessel. The results are summarised in Table 1.

Example II

The polymerization of ethylene was carried out as described in Comparative Example A, except the reaction was performed at 6.0 bar of pressure. In addition, 10.6 ml of a 0.00628 M solution of Methyl Eugenol (ME) in hexanes were added to the catalyst slurry in the injection vessel and allowed to contact for 10 minutes prior to injection into the polymerization vessel. The results are summarised in Table 1.

Example III

The polymerization of ethylene was carried out as described in Example II, except 21.2 ml of a 0.00628 M solution of Methyl Eugenol (ME) in hexanes were added to the catalyst slurry in the injection vessel and allowed to contact for 10 minutes prior to injection into the polymerization vessel. The results are summarised in Table 1.

Example IV

The polymerization of ethylene was carried out as described in Comparative Example A, except that 10.6 ml of a 0.00628 M solution of Methyl Eugenol (ME) in hexanes were added to the reactor before the reactor was pressurized with ethylene and brought to reaction temperature. The results are summarised in Table 1.

Comparative Example C

The polymerization of ethylene was carried out as described in in Comparative Example A except that 1,5 mmol tetraethoxysilane was used as an external donor was added to the reactor before the reactor was pressurized with ethylene and brought to reaction temperature while the ethylene pressure was increased to 8.0 bars. The results are summarised in Table 1.

TABLE 1

| Example. | [donor] $10^{-3}$ mol/L | [D]/[Ti] Mol/mol | $PC_2$ bar | Cat yield kg/g | BD g/l | D50 μm | span | >300 μm wt % | E.S. N/mm$^2$ |
|---|---|---|---|---|---|---|---|---|---|
| A | 0 | 0 | 4.0 | 23.6 | 476 | 172 | 0.68 | 0.4 | 0.41 |
| B | 0 | 0 | 5.0 | 20.0 | 444 | 144 | 0.63 | 0.8 | 0.62 |
| I | 0.0066 | 1 | 4.0 | 19.2 | 463 | 152 | 0.72 | 2.2 | 0.60 |
| II | 0.0132 | 2 | 6.0 | 25.5 | 466 | 168 | 0.73 | 3.4 | 0.72 |
| III | 0.0264 | 4 | 6.0 | 20.9 | 456 | 157 | 0.74 | 4.2 | 0.78 |
| IV | 0.0132 | 2 | 4.0 | 16.0 | 453 | 147 | 0.68 | 1.8 | 0.66 |
| C | 0.30 | 45 | 8.0 | 23.0 | 446 | 155 | 0.60 | 4.8 | 0.70 |

D/Ti = molar ratio donor/Ti
$PC_2$ = ethylene partial pressure
Cat yield = kilograms of polymer per gram of solid catalyst
BD = poured bulk density
D50 = average particle size of the polymer, as determined by sieve analysis
Span = particle size distribution as determined via sieve analysis ((D90 − D10)/D50)
>300 mm = wt % polymer powder not passing through the 300 mm sieve
E.S. = Elongational Stress The Comparative Examples A and B show that the catalyst according to WO2009/112254 is able to produce a polymer displaying a higher Elongational Stress, but only by lowering the polymerization temperature. This is energetically undesired because of the increased cooling demand and lower temperatures.

The data in Table 1 show that methyl eugenol donor is already at very low concentration highly effective in increasing the Elongational Stress of the produced UHMwPE even at high temperatures, while maintaining a very high bulk density and relatively low amount of coarse particles.

Comparative Example C shows that tetraethoxysilane is a less effective donor because a comparatively high amount of external donor must be applied to achieve an Elongational Stress value of 0,70 N/mm$^2$. In addition, the use of tetraethoxysilane as an external donor results in a high amount of particles >300 micro meters.

The invention claimed is:
1. A catalyst system comprising:
I. a solid reaction product obtained by reaction of:
(a) a hydrocarbon solution comprising
(1) an organic oxygen containing magnesium compound or a halogen containing magnesium compound and
(2) an organic oxygen containing titanium compound and
(b) a mixture comprising a metal compound having the formula MeR$_n$X$_{3-n}$ wherein X is a halogenide, Me is a metal of Group III of Mendeleev's Periodic System of Chemical Elements, R is a hydrocarbon radical containing 1-10 carbon atoms and 0≤n≤3 and a silicon compound of formula R$_m$SiCl$_{4-m}$ wherein 0≤m≤2 and R is a hydrocarbon radical containing 1-10 carbon atoms wherein the molar ratio of metal from I (b): titanium from I (a)(2) is lower than 1:1
II. an organo aluminium compound having the formula AlR$_3$ in which R is a hydrocarbon radical containing 1-10 carbon atoms and
III. an electron donor selected from the group of 1,2-dialkoxyalkanes, 1,2-dialkoxyalkenes and a polymeric electron donor.
2. A catalyst system comprising:
I. a solid reaction product obtained by reaction of:
(a) a hydrocarbon solution comprising
(1) an organic oxygen containing magnesium compound or a halogen containing magnesium compound and
(2) an organic oxygen containing titanium compound
(b) a mixture comprising a metal compound having the formula MeR$_n$X$_{3-n}$ wherein X is a halogenide, Me is a metal of Group III of Mendeleev's Periodic System of Chemical Elements, R is a hydrocarbon radical containing 1-10 carbon atoms and 0≤n≤3 and a silicon compound of formula R$_m$SiCl$_{4-m}$ wherein 0≤m≤2 and R is a hydrocarbon radical containing 1-10 carbon atoms wherein the molar ratio of metal from (b): titanium from (a) is lower than 1:1 and
(c) post treatment of the obtained solid reaction product with an aluminium compound having the formula

$AlR_nCl_{3-n}$ wherein R is a hydrocarbon radical containing 1-10 carbon atoms and $0<n\le3$ II. an organo aluminium compound having the formula $AlR_3$ in which R is a hydrocarbon radical containing 1-10 carbon atoms and III. an electron donor selected from the group of 1,2-dialkoxyalkanes, 1,2-dialkoxyalkenes and a polymeric electron donor.

3. A catalyst system according to claim 1, wherein the electron donor is a dialkoxy hydrocarbon compound represented by the formula (I):

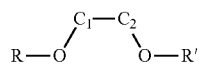

wherein $C_1$-$C_2$ is a connecting group consisting of 2 carbon atoms which are in $sp^3$ and/or $sp^2$ hybridisation form and wherein the substituent's R and R' are hydrocarbon groups with 1-10 carbon atoms and may be the same or different and may optionally be substituted with other groups containing O, N, or Si.

4. A catalyst system according to claim 1, wherein the electron donor is 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

5. A catalyst system according to claim 4, wherein the electron donor is 1-allyl-3,4-dimethoxybenzene.

6. A process for the production of ultra-high molecular weight polyethylene wherein the polymerisation takes place in the presence of a catalyst system according to claim 1.

7. A catalyst system according to claim 2, wherein the electron donor is a dialkoxy hydrocarbon compound represented by the formula (I):

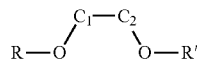

wherein $C_1$-$C_2$ is a connecting group consisting of 2 carbon atoms which are in $sp^3$ and/or $sp^2$ hybridisation form and wherein the substituent's R and R' are hydrocarbon groups with 1-10 carbon atoms and may be the same or different and may optionally be substituted with other groups containing O, N, or Si.

8. A catalyst system according to claim 2, wherein the electron donor is 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

9. A catalyst system according to claim 8, wherein the external electron donor is 1-allyl-3,4-dimethoxybenzene.

10. A process for preparing a catalyst system for the production of ultra-high molecular weight polyethylene comprising I. reacting:
(a) a hydrocarbon solution comprising
(1) an organic oxygen containing magnesium compound or a halogen containing magnesium compound and
(2) an organic oxygen containing titanium compound and
(b) a mixture comprising a metal compound having the formula $MeR_nX_{3-n}$ in which X is a halogenide, Me is a metal of Group III of Mendeleev's Periodic System of Chemical Elements, R is a hydrocarbon radical containing 1-10 carbon atoms and $0\le n\le 3$ and a silicon compound of formula $R_mSiCl_{4-m}$ wherein $0\le m\le 2$ and R is a hydrocarbon radical containing 1-10 carbon atoms wherein the molar ratio of metal from I (b): titanium from I (a)(2) i is lower than 1:1 and optionally
(c) post treatment of the obtained solid reaction product with an aluminium compound having the formula $AlR_nCl_{3-n}$ wherein R is a hydrocarbon radical containing 1-10 carbon atoms and $0<n\le3$
and combining the reaction product from (I) with
II. an organo aluminium compound having the formula $AlR_3$ in which R is a hydrocarbon radical containing 1-10 carbon atoms
wherein an electron donor selected from the group of 1,2-dialkoxyalkanes, 1,2-dialkoxyalkenes and a polymeric electron donor is added separately from the organo aluminium compound(II) and is premixed for less than 30 minutes with the solid reaction product from (I).

11. A process for the production of ultra-high molecular weight polyethylene, comprising:
polymerizing in the presence of a catalyst system comprising
I. a solid reaction product obtained by reaction of:
(a) a hydrocarbon solution comprising
(1) an organic oxygen containing magnesium compound or a halogen containing magnesium compound and
(2) an organic oxygen containing titanium compound and
(b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0\le n\le 3$ and a silicon compound of formula $R_mSiCl_{4-m}$ wherein $0\le m\le 2$ and R is a hydrocarbon radical containing 1-10 carbon atoms wherein the molar ratio of metal from I (b): titanium from I (a)(2) is lower than 1:1
II. an organo aluminium compound having the formula $AlR_3$ in which R is a hydrocarbon radical containing 1-10 carbon atoms
wherein an electron donor is added during the polymerisation.

12. The process of claim 11, wherein the donor is not used during or in the preparation of the solid reaction product (I).

* * * * *